United States Patent
Bergström et al.

(10) Patent No.: US 9,572,168 B2
(45) Date of Patent: Feb. 14, 2017

(54) FAST TERMINATION OF SOUNDING REFERENCE SIGNALS AND CHANNEL QUALITY INDICATOR TRANSMISSIONS

(71) Applicant: Telefonaktiebolaget L M Ericsson (publ), Stockholm (SE)

(72) Inventors: Mattias Bergström, Stockholm (SE); Mikael Wittberg, Uppsala (SE); Walter Müller, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/431,263

(22) PCT Filed: Sep. 25, 2013

(86) PCT No.: PCT/SE2013/051113
§ 371 (c)(1),
(2) Date: Mar. 25, 2015

(87) PCT Pub. No.: WO2014/051505
PCT Pub. Date: Apr. 3, 2014

(65) Prior Publication Data
US 2015/0296522 A1    Oct. 15, 2015

Related U.S. Application Data

(60) Provisional application No. 61/707,419, filed on Sep. 28, 2012.

(51) Int. Cl.
*H04W 72/08*    (2009.01)
*H04L 1/00*    (2006.01)
(Continued)

(52) U.S. Cl.
CPC ........... *H04W 72/08* (2013.01); *H04B 7/0456* (2013.01); *H04B 7/0626* (2013.01);
(Continued)

(58) Field of Classification Search
CPC ... H04B 7/0456; H04B 7/0626; H04L 1/0001; H04L 1/0026; H04L 5/0048; H04L 5/0053; H04L 5/0057; H04W 24/02; H04W 72/0406; H04W 72/08; H04W 72/087
See application file for complete search history.

(56) References Cited

U.S. PATENT DOCUMENTS

| | | | | |
|---|---|---|---|---|
| 2012/0113845 | A1* | 5/2012 | Kim | ............. H04L 5/0037 370/252 |
| 2012/0176926 | A1* | 7/2012 | Jang | ............. H04W 24/02 370/252 |
| 2013/0148535 | A1* | 6/2013 | Baghel | ............. H04L 1/0026 370/252 |

OTHER PUBLICATIONS

International Search Report and Written Opinion of the International Searching Authority, PCT Application No. PCTSE2013/051113, Dec. 5, 2013.

(Continued)

*Primary Examiner* — Khoa Huynh
(74) *Attorney, Agent, or Firm* — Myers Bigel, P.A.

(57) ABSTRACT

Methods and operations in mobile terminals and base stations are disclosed which control uplink signaling. A method in a mobile terminal controls uplink signaling to a base station, and includes receiving a MAC CE from the base station. The MAC CE indicates whether at least one of SRS or CQI reports should be transmitted for one or more serving cells configured for the mobile terminal. Transmission of at least one of the SRS or the CQI reports for the one or more serving cells from the mobile terminal to the base station is selectively activated and deactivated responsive to the MAC CE. Related methods and operations by base stations and mobile terminals are disclosed.

15 Claims, 6 Drawing Sheets

(51) Int. Cl.
  *H04B 7/04*   (2006.01)
  *H04B 7/06*   (2006.01)
  *H04L 5/00*   (2006.01)
  *H04W 72/04*  (2009.01)
(52) U.S. Cl.
  CPC .......... *H04L 1/0001* (2013.01); *H04L 1/0026* (2013.01); *H04L 5/0048* (2013.01); *H04L 5/0057* (2013.01); *H04W 72/0406* (2013.01); *H04W 72/085* (2013.01)

(56) References Cited

OTHER PUBLICATIONS

International Preliminary Report on Patentability, PCT Application No. PCTSE2013/051113, Jan. 12, 2015.
3GPP, Technical Specification, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.3.0 (Sep. 2012), 205 pp.
Intel Corporation, "Downlink control signalling for DL CoMP", Agenda Item: 7.5.5, Document for: Discussion and Decision, 3GPP TSG-RAN WG1 #68bis, R1-121517, Jeju, Korean, Mar. 26-30, 2012, 4 pp.
Nokia, "Carrier Aggregation and Release 10 related work", Agenda Item 4.2, Document for: Information and Discussion, 3GPP TSG RAN WG R5 Meeting #51, R5-112447, Barcelona, Spain, May 9-13, 2011, 4 pp.
Samsung, "CSI reporting and SRS timing upon SCell activation/deactivation", Agenda Item: 6.2.1, Document for: Discussion, 3GPP TSG-RAN1#63bis meeting, Dublin Ireland, Jan. 17-21, 2011, 5 pp.

\* cited by examiner

FAST TERMINATION OF SOUNDING REFERENCE SIGNALS AND CHANNEL QUALITY INDICATOR TRANSMISSIONS

CROSS REFERENCE TO RELATED APPLICATIONS

This application is a 35 U.S.C. §371 national stage application of PCT International Application No. PCT/SE2013/051113, filed on 25 Sep. 2013, which itself claims priority to U.S. provisional Patent Application No. 61/707,419, filed 28 Sep. 2012, the disclosure and content of both of which are incorporated by reference herein in their entirety. The above-referenced PCT International Application was published in the English language as International Publication No. WO 2014/051505 A1 on 3 Apr. 2014.

TECHNICAL FIELD

The present invention relates to the control of uplink signaling in a wireless communication system using carrier aggregation.

BACKGROUND

Carrier aggregation is one of the new features recently developed by the members of the 3rd-Generation Partnership Project (3GPP) for so-called Long Term Evolution (LTE) systems, and is standardized as part of LTE Release 10, which is also known as LTE-Advanced. An earlier version of the LTE standards, LTE Release 8, supports bandwidths up to 20 MHz. In LTE-Advanced, bandwidths up to 100 MHz are supported. The very high data rates contemplated for LTE-Advanced will require an expansion of the transmission bandwidth. In order to maintain backward compatibility with LTE Release 8 mobile terminals, the available spectrum is divided into Release 8—compatible chunks called component carriers. Carrier aggregation enables bandwidth expansion beyond the limits of LTE Release 8 systems by allowing mobile terminals to transmit data over multiple component carriers, which together can cover up to 100 MHz of spectrum. Importantly, the carrier aggregation approach ensures compatibility with earlier Release 8 mobile terminals, while also ensuring efficient use of a wide carrier by making it possible for legacy mobile terminals to be scheduled in all parts of the wideband LTE-Advanced carrier.

The number of aggregated component carriers, as well as the bandwidth of the individual component carrier, may be different for uplink (UL) and downlink (DL) transmissions. A carrier configuration is referred to as "symmetric" when the number of component carriers in each of the downlink and the uplink are the same. In an asymmetric configuration, on the other hand, the numbers of component carriers differ between the downlink and uplink. The number of component carriers configured for a geographic cell area may be different from the number of component carriers seen by a given mobile terminal. A mobile terminal, for example, may support more downlink component carriers than uplink component carriers, even though the same number of uplink and downlink component carriers may be offered by the network in a particular area.

LTE systems can operate in either Frequency-Division Duplex (FDD) mode or Time-Division Duplex (TDD) mode. In FDD mode, downlink and uplink transmissions take place in different, sufficiently separated, frequency bands. In TDD mode, on the other hand, downlink and uplink transmission take place in different, non-overlapping time slots. Thus, TDD can operate in unpaired spectrum, whereas FDD requires paired spectrum. TDD mode also allows for different asymmetries in terms of the amount of resources allocated for uplink and downlink transmission, respectively, by means of different downlink/uplink configurations. These differing configurations permit the shared frequency resources to be allocated to downlink and uplink use in differing proportions. Accordingly, uplink and downlink resources can be allocated asymmetrically for a given TDD carrier.

One consideration for carrier aggregation is how to transmit control signaling from the mobile terminal on the uplink to the wireless network. Uplink control signaling may include acknowledgement (ACK) and negative-acknowledgement (NACK) signaling for hybrid automatic repeat request (Hybrid ARQ, or HARQ) protocols, channel state information (CSI) and channel quality information (CQI) reporting for downlink scheduling, and scheduling requests (SRs) indicating that the mobile terminal needs uplink resources for uplink data transmissions.

Another element of uplink transmissions in LTE systems is the Sounding Reference Signal (SRS), which can be viewed as a type of pilot signal sent by an LTE mobile terminal (commonly called "user equipment," or "UE," in 3GPP documentation. Because the receiving base station (an "eNodeB," or "eNB," in 3GPP terminology) knows what the received SRS should look like, it can estimate the channel according to this formula:

Received signal=Sent signal*Channel+Noise

The eNB can use the channel estimate obtained from SRS to perform link adaptation, to select an appropriate modulation and coding scheme (MCS) for the UE, etc.

In LTE, there are two types of SRS. Aperiodic SRS is sent by the UE upon request from the eNB. Periodic SRS is sent by the UE periodically. The periodic SRS is beneficial compared to the aperiodic SRS in that the eNB does not need to specifically request each periodic SRS transmission.

Channel Quality Indicator (CQI) refers to a measurement of downlink reference symbols, performed by a UE, and the resulting report sent to the eNB. The measurements may be made on Cell-specific Reference signals (CRS) and/or UE-specific reference signals. The UE knows the CRS signal and/or UE-specific reference signals sent by the eNB and estimates the effects of the downlink channel, again according to the basic formula:

Received signal=Sent signal*Channel+Noise

The UE reports the channel estimation results back to the eNB and the eNB can use the information to perform link adaptation, select an appropriate modulation and coding scheme (MCS) for the UE etc. Note that in LTE, the reported channel estimate information is referred to as Channel State Information (CSI) or a channel-state report, which is a combination of a Channel Quality Indicator (CQI), which indicates the highest modulation-and-coding scheme that could be used in the downlink while maintaining a target block-error rate, a Rank Indicator, which indicates a transmission rank to use, and a precoder matrix indicator (PMI), which recommends a precoding matrix to be used for multi-layer transmission.

A time-alignment or timing-advance (TA) mechanism has been introduced in LTE to ensure that the uplink signals from different UEs are received by the network receiver in a time-aligned fashion. The UE maintains a TA value that tells the UE how much it should advance its uplink signals in relation to a timing reference. The eNB then sends TA commands to each UE, ordering them to transmit their UL signals earlier or later, i.e., to decrease or increase their TA value respectively, so that all UE's signals reach the receiving eNB time-aligned.

The UE has a TA timer that controls the validity of the TA value. If the TA timer is running, then the TA value is considered valid and the UE is allowed to perform UL transmissions. When the UE applies a received TA command it restarts the TA timer which means that the period for which the TA value is valid is extended. When the TA timer expires the UE is considered out-of-sync and is not allowed to perform uplink transmissions.

To support uplink carrier aggregation of uplink cells received at different reception points, Release 11 of the LTE specifications introduces multiple TA values. The concept of TA groups (TAGs) is also introduced. Each TA group has a TA value, a TA timer and a timing reference (the timing reference is the downlink reception timing of a cell within the TA group). A UE's cells may be grouped together in the TA groups according to which reception point is receiving the uplink transmissions for the cells, for example. The TAG containing the primary cell (PCell) is called the PCell TA group, or pTAG, but can contain one or more secondary cells (SCells). There can also be up to four other TA groups for a UE, each including only secondary cells, and which are called SCell TA groups, or sTAGs. Which TA group a UE's serving cells belong to is decided by the eNB and signaled by RRC signaling to the UE.

Since the PCell is "always on" and is needed for the UE to maintain connection to the network, it is expected that the pTAG's TA timer needs to always run when the UE is in connected state. sTAGs, however, only contain SCells, which are additional resources and are therefore less important.

The UE receives the configuration for periodic SRS and periodic CQI from the eNB through Radio Resource Control (RRC) signaling. RRC signaling is comparatively slow, relative to Medium Access Control (MAC) signaling, and within 3GPP it has been targeted that RRC messages should be sent, if possible, less than once per second. Accordingly, there are no mechanisms to permit the eNB to stop periodic SRS/CQI signaling on a short timescale.

SUMMARY

One embodiment disclosed herein is directed to a method in a mobile terminal for controlling uplink signaling to a base station. The method includes receiving a medium access control (MAC) control element (CE) from the base station. The MAC CE indicates whether at least one of Sounding Reference Signals (SRS) or Channel Quality Indicator (CQI) reports should be transmitted for one or more serving cells configured for the mobile terminal. Transmission of at least one of the SRS or the CQI reports for the one or more serving cells from the mobile terminal to the base station is selectively activated and deactivated responsive to the MAC CE.

Potential advantages of this and other embodiments can include providing fast termination of uplink signaling from a mobile terminal to a base station. The uplink signaling is more immediately controlled by MAC CE signaling instead of waiting for the UE to receive and respond to RRC signaling from the base station to configure the periodic SRS and periodic CQI signaling, which enables much faster termination of uplink signaling when desired. The uplink signaling can be quickly terminated for secondary cells (SCells) and/or a primary cell (PCell) configured for the mobile terminal.

In a further embodiment, the MAC CE indicates whether both the SRS and the CQI reports for the one or more serving cells should be transmitted. The mobile terminal selectively activates and deactivates the transmission of both the SRS and the CQI reports for the one or more serving cells to the base station responsive to the MAC CE.

In a further embodiment, the MAC CE that the mobile terminal receives from the base station includes a bitmap comprising a bit value for each of one or more SCells configured for the mobile terminal which indicates whether at least one of the SRS or the CQI reports for the SCell should be transmitted. The mobile terminal activates and deactivates transmission of at least one of the SRS or the CQI reports for each of the one or more SCells responsive to the bit value of the bitmap corresponding to the SCell.

In a further embodiment, the MAC CE that the mobile terminal receives from the base station includes a bitmap further comprising a bit value for a PCell configured for the mobile terminal which indicates whether at least one of the SRS or the CQI reports for the PCell should be transmitted. The mobile terminal activates and deactivates transmission of at least one of the SRS or the CQI reports for the PCell responsive to the bit value of the bitmap for the PCell.

Another related embodiment disclosed herein is directed to a method in a base station for controlling uplink signaling from a mobile terminal. The method includes determining that at least one of SRS or CQI reports from the mobile terminal should be selectively activated or deactivated for one or more serving cells configured for the mobile terminal. A MAC CE is formed indicating whether at least one of the SRS or the CQI reports should be transmitted by the mobile terminal for the one or more serving cells responsive to the determining, and the MAC CE is transmitted to the mobile terminal.

Another related embodiment disclosed herein is directed to a mobile terminal that controls uplink signaling to a base station. The mobile terminal includes at least one processor and at least one memory. The at least one memory is coupled to the at least one processor and includes computer readable program code that when executed by the at least one processor causes the at least one processor to perform operations including receiving a MAC CE from the base station. The MAC CE indicates whether at least one of SRS or CQI reports should be transmitted for one or more serving cells configured for the mobile terminal. The operations further include selectively activating and deactivating transmission of at least one of the SRS or the CQI reports for the one or more serving cells from the mobile terminal to the base station responsive to the MAC CE.

Another related embodiment disclosed herein is directed to a base station that controls uplink signaling from a mobile terminal. The base station includes at least one processor and at least one memory. The at least one memory is coupled to the at least one processor and includes computer readable program code that when executed by the at least one processor causes the at least one processor to perform operations including determining that at least one of SRS or CQI reports from the mobile terminal should be selectively activated or deactivated for one or more serving cells configured for the mobile terminal. The operations further include forming a MAC CE indicating whether at least one of the SRS or the CQI reports should be transmitted by the mobile terminal for the one or more serving cells responsive to the determining, and transmitting the MAC CE to the mobile terminal.

It is noted that aspects described with respect to one embodiment may be incorporated in different embodiments although not specifically described relative thereto. That is, all embodiments and/or features of any embodiments can be combined in any way and/or combination. Moreover, other control nodes, systems, methods, and/or computer program products according to embodiments will be or become apparent to one with skill in the art upon review of the following drawings and detailed description. It is intended that all such additional control nodes, systems, methods, and/or computer program products be included within this description and protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

Figure 1:
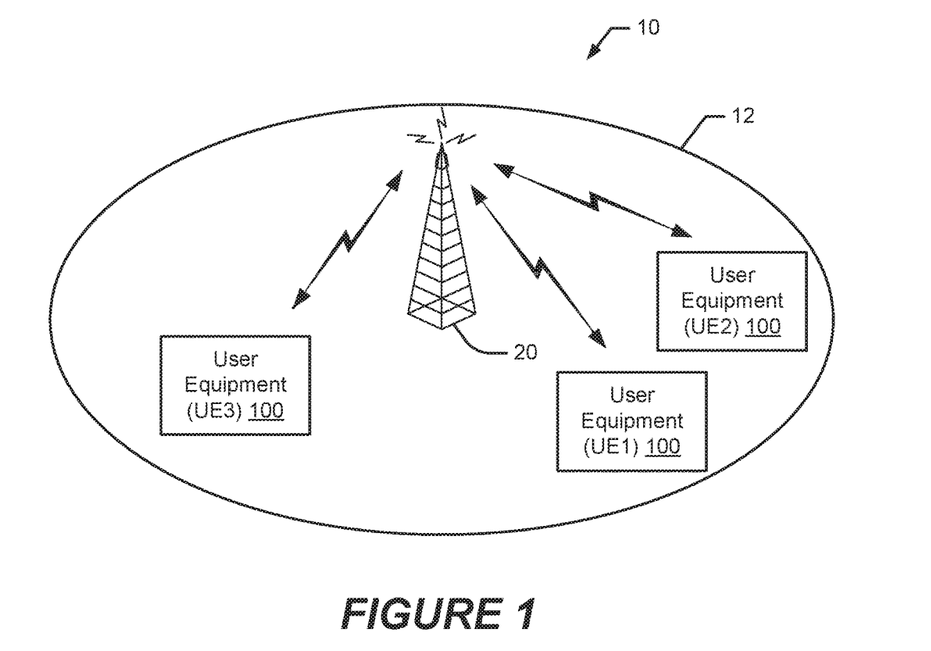
FIG. 1 is a block diagram of a mobile communication network for providing wireless communication services to mobile terminals in accordance with some embodiments.

Referring now to the attached drawings, FIG. 1 illustrates an example mobile communication network 10 for providing wireless communication services to mobile terminals 100. Three mobile terminals 100, which are referred to as "user equipment" or "UE" in LTE terminology, are shown in FIG. 1. The mobile terminals 100 may comprise, for example, cellular telephones, personal digital assistants, smart phones, laptop computers, handheld computers, or other devices with wireless communication capabilities. The mobile communication network 10 comprises a plurality of geographic cell areas or sectors 12. Each geographic cell area or sector 12 is served by a base station 20, which is referred to in LTE as a NodeB or Evolved NodeB (eNodeB). One base station 20 may provide service in multiple geographic cell areas or sectors 12. The mobile terminals 100 receive signals from base station 20 on one or more downlink (DL) channels, and transmit signals to the base station 20 on one or more uplink (UL) channels.

Although details are not shown in FIG. 1, it will be appreciated that the base station 20 may simultaneously transmit and receive on each of several different and discrete carriers, or "cells," i.e., using carrier aggregation techniques such as those specified in the standards for LTE-Advanced. Further, while only a single base station 20, it will also be appreciated that one or more of the mobile terminals 100 may be configured to handle transmissions from and/or to two or more base stations 20 and/or two or more geographically separated transmission points.

For illustrative purposes, several embodiments of the present invention will be described in the context of a Long-Term Evolution (LTE) system, particularly an LTE system utilizing carrier aggregation. Those skilled in the art will appreciate, however, that several embodiments of the present invention may be more generally applicable to other wireless communication systems, including, for example, WiMax (IEEE 802.16) systems.

In the discussion that follows, specific details of particular embodiments of the present invention are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as to not obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors (processing circuits) or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other electronic hardware capable of (configured for) performing such functions and/or executing software, such as the example hardware recited above.

Techniques for selectively muting a UE's uplink transmissions on one or more cells have been discussed. One approach is for the network to simply allow the TA timer for the cell's TA group to expire. The UE would then release the SRS configuration for those cells. Another approach is to introduce a TAT-stop Medium Access Control (MAC) layer control element (CE). A UE receiving a TAT-stop MAC CE would stop a TA timer, and refrain from sending SRS on the cell or cells corresponding to the TA timer, but would maintain SRS/CQI report configurations. Note that CQI is still reported for the PCell, since the PCell is always active.

There are problems with both of these approaches, however. Allowing the TA timer to expire to stop SRS/CQI is slow, since TA timers can be configured to run for 0.5 s-10 s, or forever. With a TAT-stop MAC CE, on the other hand, it is not possible to stop SRS/CQI for a single cell, as the granularity is per TA group. Thus, it remains that there is no way to stop SRS/CQI for a cell in an efficient way.

According to several embodiments of the present invention, this problem is addressed by introducing a new MAC CE for transmission by an eNB to a UE (or, more generally, from a base station 20 to a UE 100), the new MAC CE including data that allows a UE receiving the MAC CE to identify at least the serving cells (e.g., secondary cells and/or primary cell) on which the UE should stop transmitting SRS, or CQI, or both. In some cases, as detailed further below, this data is provided in the form of a bitmap.

In some embodiments, a UE 100 can maintain up to five cells, one primary cell (PCell) and four secondary cells (SCells). Each cell has a cell index and the range for cell indexes is 0-7. The PCell always has index 0. Note that the number of cell indexes is larger than the number of cells a UE 100 can be configured with, in accordance with some embodiments. A UE 100 according to some other embodiments can maintain another plural number of cells.

For example, a value of "1" in a given location of the bitmap means that SRS should be stopped for a particular secondary cell (which is logically associated with the given location of the logic "1" value in the bitmap), while a value of "0" means that SRS shall be started for the particular secondary cell. The opposite mapping of these values may be used. Note that in some embodiments, if the UE 100 has received one MAC CE indicating that the UE 100 shall stop SRS on cell X and a following MAC CE also indicates that the UE 100 shall stop SRS on cell X, then the UE 100 would continue to refrain from transmitting SRS on cell X.

In some embodiments the bitmap is 8 bits long, where each bit is mapped to one of the possible cell indexes. For example, the most significant bit in the MAC CE bitmap is mapped to cell index 7 and least significant bit is mapped to cell index 0. (Again, other mappings are possible.) An example is illustrated in FIG. 2a, where the most significant bit is on the left-hand side. In the illustrated example, the target UE 100 is configured with a PCell (cell index 0) and three SCells, having cell indices of 1, 3, and 6. The desired UE 100 configuration with respect to SRS transmissions is also shown—after receiving the MAC CE, the UE 100 determines from the MAC CE that it should transmit SRS on the PCell (index 0) and the SCell having an index of 3 (i.e., index locations 0 and 3 in the bitmap have logic "1" value), but not on the others (i.e., the SCells having indices 1 and 6 in the bitmap having logic "0" value). Accordingly, an eight-bit MAC CE payload is shown in FIG. 2a, with the value "1" appearing in bit positions 0 and 3 and the value "0" appearing in positions 1 and 6. In this particular example, the other locations are marked "X," for "don't care," since the UE 100 is not configured with a cell corresponding to any of these cell indices.

Figure 2:
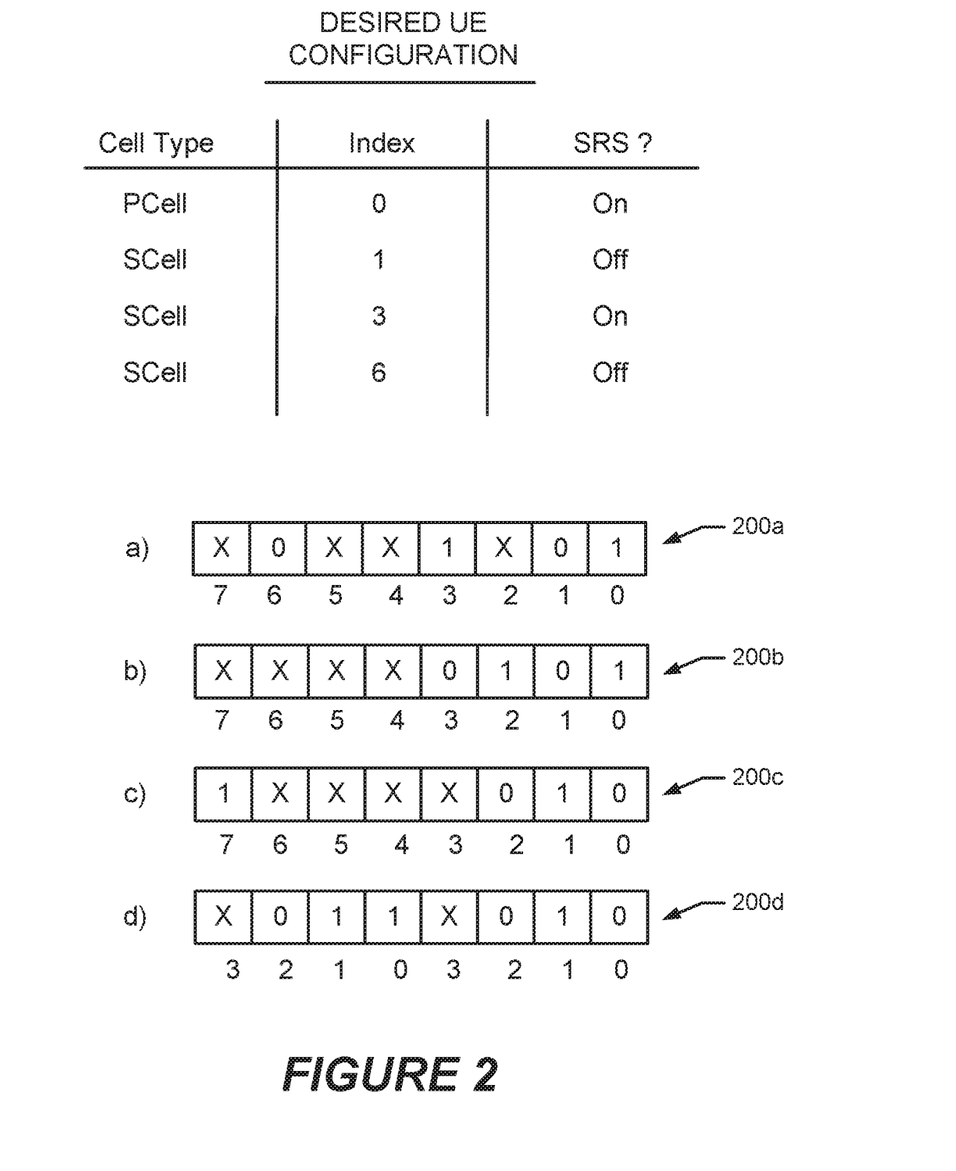
FIGS. 2a-2d are example Medium Access Control (MAC) Control Element (CE) bitmaps that indicate whether SRS and/or CQI should be activated or deactivated for particular SCells and PCell configured for a mobile terminal in accordance with some embodiments.

This logical configuration of the example bitmap is further illustrated in FIG. 2 by the example table "Desired UE Configuration". A base station 20 forms the MAC CE having a bitmap with logical values set at index locations 0, 1, 3, and 6, corresponding to the PCell and three SCells configured for the UE, and which logical values cause the UE 100 receiving the MAC CE to selectively activate and deactivate transmission of SRS and/or CQI reports for the corresponding PCell and SCells.

In other embodiments, a 5-bit bitmap is used, where the UE 100 is mapping the most significant bit (MSB) in the bitmap to the configured cell with the highest cell index and the least significant bit (LSB) to the cell with the lowest cell index, or vice versa. In some embodiments, the PCell is not addressed by the bitmap, in which case the bitmaps could instead be 7 bits or 4 bits in length, depending on whether the bitmap addresses all of the possible secondary cell indexes or only the up to four possibly configured secondary cells. A 5-bit bitmap for the same example described above is shown at FIG. 2b, where the last four bit locations carry the values "0", "1", "0", and "1", respectively, indicating that the UE 100 should transmit SRS on the PCell and the Scell having the second highest index among the configured SCells, and should refrain from transmitting SRS on any other configured cells. Likewise, FIG. 2c illustrates a 4-bit bitmap for the same scenario, where the values "0", "1", and "0" in the last three bit positions indicate whether or not SRS should be transmitted for the configured SCells with indices 1, 3, and 6, respectively. (The "1" value in bit position 7 is explained below).

Given the range of solutions described above, if the MAC CE has length 1 byte, there could be 0, 1, 3 or 4 unused bits. One of these unused bits may be used in some embodiments to distinguish whether it is SRS transmissions that should be stopped or whether it is CQI that should be stopped, e.g., by setting a particular unused bit to 1 or 0 respectively. An example is shown in FIG. 2c, where bit 7 of the MAC CE byte carries a "1," to indicate that the instructions carried by the byte are directed to SRS transmissions. Alternatively, one bit value might indicate that only SRS transmissions should be stopped for those secondary cells identified by the bitmap, while the other bit value indicates that both SRS transmissions and CQI transmissions should be stopped.

If two of the unused bits are used, it would be possible to indicate whether only SRS transmissions should be stopped, or whether only CQI transmissions should be stopped, or whether both should be stopped.

If the PCell is not included and a four bit bitmap is used, where the MSB is mapped to the highest cell and the LSB is mapped to the lowest cell index (or vice versa), only four bits are needed to indicate the SCells. As we would have four unused bits, given a one-byte MAC CE payload, it would be possible to have another bitmap of size four to fit in the one-byte MAC CE. In this case, one 4-bit bitmap indicates whether SRS should be stopped/started, for each of the up to four configured SCells, while a second 4-bit bitmap indicates whether CQI shall be stopped. An example of this approach is illustrated in FIG. 2d, where the four rightmost bits of the MAC CE byte indicate whether SRS should be transmitted for the up to four configured SCells, and the four leftmost bits indicate whether CQI should be transmitted, for each SCell. Thus, for example, bits 3, 2, 1, 0 of the four leftmost bits of the MAC CE byte can individually indicate whether CQI should be stopped/started for each of the SCell indices 4, 3, 2, 1 respectively, and likewise bits 3, 2, 1, 0 of the four rightmost bits of the MAC CE byte can individually indicate whether SRS should be stopped/started for each of the SCell indices 4, 3, 2, 1 respectively. It should be appreciated that it could be the four leftmost bits that carries the bitmap indicating if CQI shall be transmitted and the four rightmost bits that carries the bitmap indicating if SRS shall be transmitted.

Accordingly, the base station 20 can control the mobile terminal 100 through communication of the MAC CE to cause the mobile terminal 100 to selectively activate transmission (cause transmission) and deactivate transmission (prevent transmission) of SRS and/or CQI for particular individually identified one or more of the SCells and/or the PCell that is configured for the mobile terminal 100.

Note that while the above examples refer to CQI, the techniques can be applied more generally to signal whether CSI or other channel-state reporting should be suspended.

Figure 3:
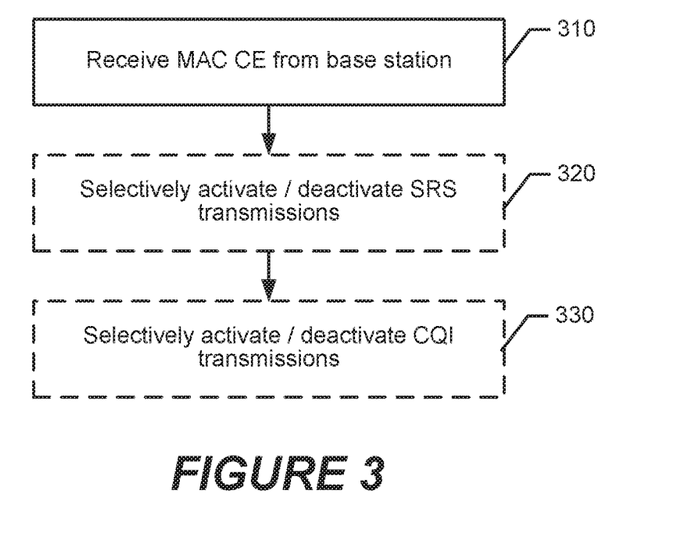
FIG. 3 is a process flow diagram that shows an example procedure in a mobile terminal for controlling uplink signaling to a base station in accordance with some embodiments.

FIG. 3 is a process flow diagram that shows an example procedure for a mobile terminal 100 (e.g., an LTE UE) in accordance with a non-limiting example embodiment of the present invention. As shown at block 310, the process begins with the mobile terminal 100 receiving a MAC CE from a base station 20, the MAC CE comprising a plurality of bits that indicate whether at least one of SRS or CQI reports should be transmitted for each of one or more serving cells (e.g., SCells and/or PCell) configured for the mobile terminal 100. As shown at block 320, the process continues with the mobile terminal 100 selectively activating and deactivating SRS transmissions on each configured serving cells (e.g., SCells and/or PCell), based on the plurality of bits in the MAC CE. It will be understood that any of the various techniques for assembling/interpreting the MAC CE described above may apply to the illustrated method. Thus, in some embodiments the MAC CE comprises a bitmap that includes a bit value for at least each configured SCell. In some cases the bitmap may also include a bit value corresponding to the PCell. In some embodiments the bitmap may comprise a bit location for each possible cell index, while in others it may comprise only a bit location for up to the maximum number of configured cells, in some cases including a location for the PCell, and in other cases not.

In some embodiments, the received MAC CE includes one or more additional or alternative bits that indicate whether the MAC CE is providing activation/deactivation information applicable to SRS transmissions only, or channel-state information transmissions only, or both. Accordingly, as shown in block 330, some embodiments of the illustrated method may further comprise selectively activating and deactivating CQI (or CSI) report transmissions on configured SCells.

FIG. 3 shows blocks 320 and 330 in dashed lines, indicating that their operations may not appear in all embodiments. In some embodiments, SRS transmissions are activated/deactivated. In some other embodiments, CQI transmissions are activated/deactivated. In yet some other embodiments, SRS and CQI transmissions are activated/deactivated.

Thus, MAC CE can be used to selectively activate and deactivate (320, 330) transmission of at least one of the SRS or the CQI reports for each of the one or more serving cells (e.g., SCells and/or PCell) from the mobile terminal 100 to the base station 20. The MAC CE, base station 20, and mobile terminal 100 may therefore be: 1) configured to activate and deactivate both SRS and CQI reports; 2) configured to activate and deactivate SRS without be configured to activate and deactivate CQI reports; or 3) configured to activate and deactivate CQI reports without be configured to activate and deactivate SRS.

In some further embodiments, the MAC CE indicates whether channel state information comprising the CQI reports, rank indicators indicating transmission rank, and precoder matrix indicators for each of the one or more SCells should be transmitted by the mobile terminal 100. The mobile terminal 100 then selectively activates and deactivates (block 330) transmission of the channel state information comprising the CQI reports, the rank indicators, and the precoder matrix indicators for each of the one or more serving cells (e.g., SCells and/or PCell) to the base station 20 responsive to the MAC CE.

Figure 6:
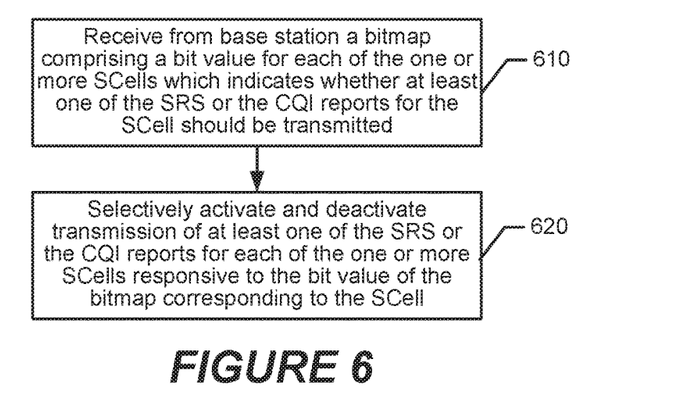
FIGS. 6-8 are further process flow diagrams that show example procedures in a mobile terminal for controlling uplink signaling to a base station in accordance with some embodiments.
Figure 7:
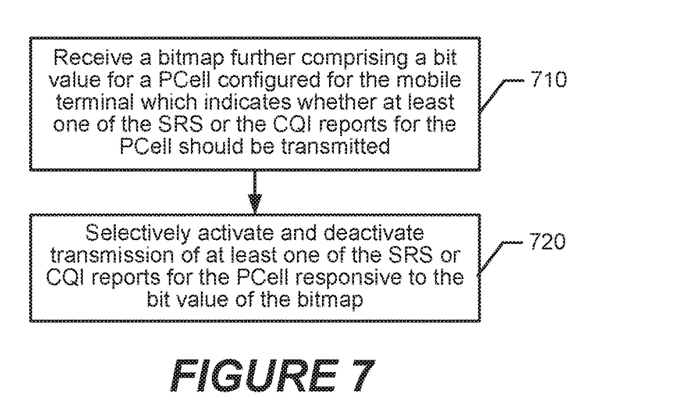
Figure 8:
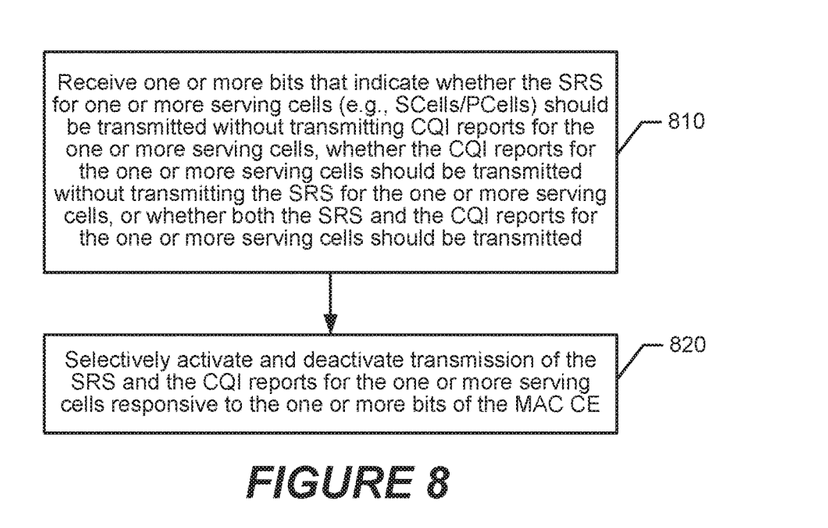

FIGS. 6-8 are further process flow diagrams that show example procedures in a mobile terminal 100 for controlling uplink signaling to a base station 20 in accordance with some embodiments.

In the embodiment of FIG. 6, the mobile terminal 100 receives (block 610) the MAC CE from the base station 20 as a bitmap (e.g., one of bitmaps 200a-200d) comprising a bit value for each of the one or more SCells which indicates whether at least one of the SRS or CQI reports for the SCell should be transmitted. The mobile terminal 100 then selectively activates and deactivates (block 620) transmission of at least one of the SRS or the CQI reports for the one or more SCells responsive to the bit value of the bitmap (e.g., one of bitmaps 200a-200d) corresponding to the SCell.

In a further embodiment, the bitmap (e.g., bitmap 200d) that is received comprises at least 4 bit values for each of at least four of the SCells which indicate whether at least one of the SRS or the CQI reports for the at least four of the SCells should be transmitted. The mobile terminal 100 then selectively activates and deactivates transmission of at least one of the SRS or the CQI reports for each of the at least four of the SCells responsive to the bit value of the bitmap for the SCell.

In the embodiment of FIG. 7, the bitmap received (block 710) by the mobile terminal 100 further comprises a bit value for a PCell configured for the mobile terminal 100 which indicates whether at least one of the SRS or the CQI reports for the PCell should be transmitted. The mobile terminal 100 then selectively activates and deactivates (block 720) transmission of at least one of the SRS or the CQI reports for the PCell responsive to the bit value of the bitmap for the PCell.

In the embodiment of FIG. 8, the mobile terminal 100 receives (block 810) one or more bits (e.g., bitmap 200d) that indicate whether the SRS for the one or more serving cells (e.g., SCells and/or PCell) should be transmitted without transmitting CQI reports for the one or more serving cells (e.g., SCells and/or PCell), whether the CQI reports for the one or more serving cells (e.g., SCells and/or PCell) should be transmitted without transmitting the SRS for the one or more serving cells (e.g., SCells and/or PCell), or whether both the SRS and the CQI reports for the one or more serving cells (e.g., SCells and/or PCell) should be transmitted. The mobile terminal 100 then selectively activates and deactivates (block 820) transmission of at least one of the SRS and the CQI reports for the one or more serving cells (e.g., SCells and/or PCell) responsive to the one or more bits of the MAC CE.

Figure 4:
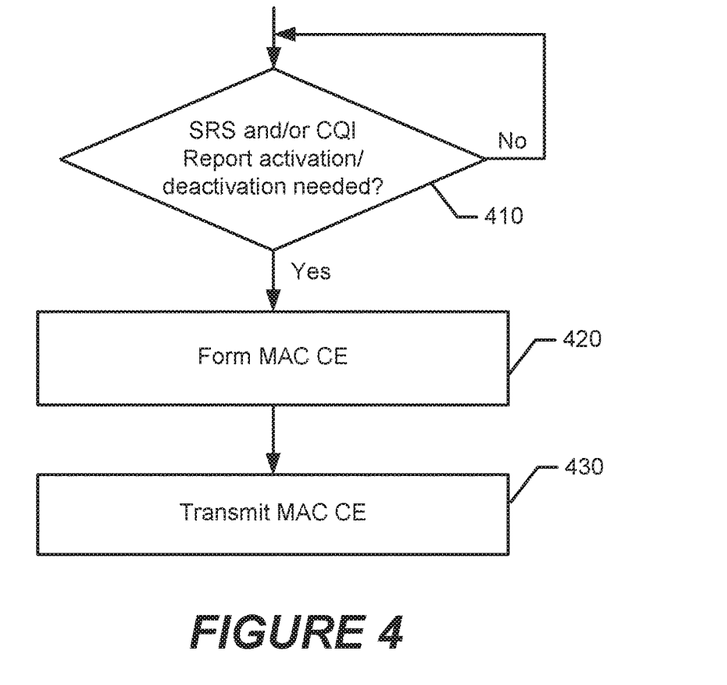
FIG. 4 is a process flow diagram that shows an example procedure in a base station for controlling uplink signaling from a mobile terminal in accordance with some embodiments.

FIG. 4 is a process flow diagram that shows an example procedure for a base station 20 (e.g., an LTE eNB) in accordance with a non-limiting example embodiment of the present invention. As shown at block 410, the process begins with determining that at least one of SRS transmissions or CQI reports from a particular mobile terminal 100 should be selectively activated and/or deactivated for one or more serving cells (e.g., SCells and/or PCell). As shown at block 420, the process continues with the forming of a MAC CE that comprises a plurality of bits that indicate whether at least one of the SRS or the CQI reports should be transmitted by the mobile terminal 100 for one or more serving cells (e.g., SCells and/or PCell) configured for the mobile terminal 100. Again, any of the variant techniques described above for signaling SRS and/or CQI reports activation/deactivation and/or channel-state reporting activation/deactivation may be used. Finally, as shown at block 430, the process continues with transmitting the MAC CE to the target mobile terminal 100.

FIGS. 9-12 are further process flow diagrams that show example procedures in a base station 20 for controlling uplink signaling from a mobile terminal 100 in accordance with some embodiments.

Figure 9:
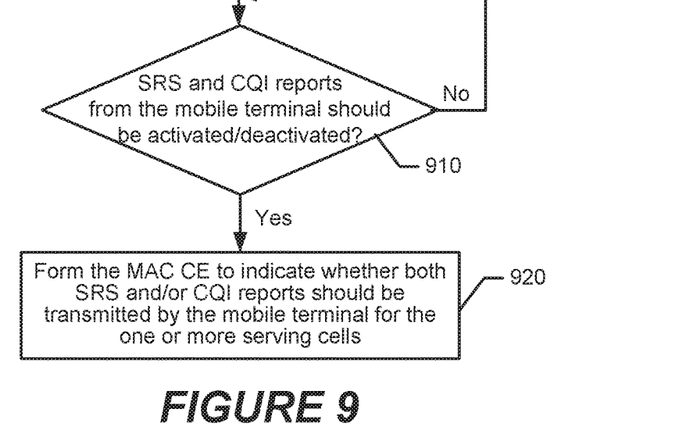
FIGS. 9-12 are further process flow diagrams that show example procedures in a base station for controlling uplink signaling from a mobile terminal in accordance with some embodiments.

In the embodiment of FIG. 9, the base station 20 determines (block 910) that both the SRS and CQI reports from the mobile terminal 100 should be selectively activated or deactivated for the one or more serving cells (e.g., SCells and/or PCell). The base station 20 responsively forms (block 920) the MAC CE to indicate both the SRS and the CQI reports should be transmitted by the mobile terminal 100 for the one or more serving cells (e.g., SCells and/or PCell).

In a further embodiment, the base station 20 determines whether channel state information comprising the CQI reports, rank indicators indicating transmission rank, and precoder matrix indicators should be selectively activated or deactivated for the one or more serving cells (e.g., SCells and/or PCell). The base station 20 then forms the MAC CE to indicate whether the CQI reports, the rank indicators, and the precoder matrix indicators should be transmitted by the mobile terminal 100 for the one or more serving cells (e.g., SCells and/or PCell).

Figure 10:
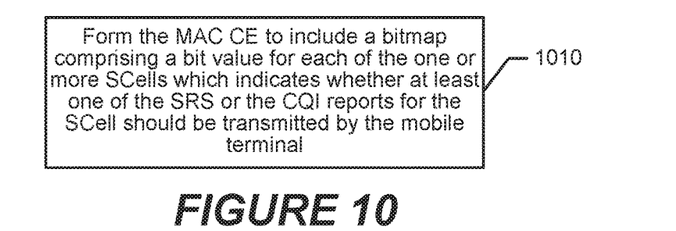

In the embodiment of FIG. 10, the base station 20 forms (block 1010) the MAC CE to comprise a bitmap (e.g., one of bitmaps 200a-200d) comprising a bit value for each of the one or more SCells configured for the mobile terminal (100) which indicates whether at least one of the SRS or the CQI reports for the SCell should be transmitted by the mobile terminal 100.

Figure 11:
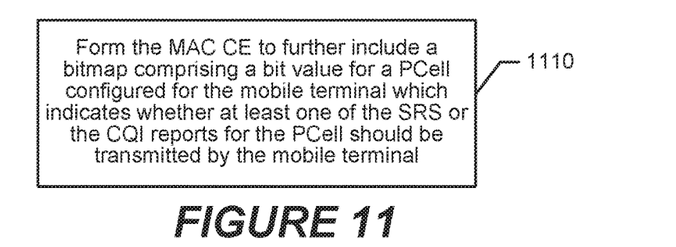

In the embodiment of FIG. 11, the base station 20 forms (block 1110) the MAC CE to comprise a bitmap (e.g., one of bitmaps 200a-200d) comprising a bit value for a PCell configured for the mobile terminal 100 which indicates whether the SRS for the PCell should be transmitted by the mobile terminal 100.

In a further embodiment, the base station 20 forms the MAC CE to comprise a bitmap (e.g., bitmap 200d) comprising at least 4 bit values for each of at least four of the SCells which indicate whether at least one of the SRS or the CQI reports for the at least four of the SCells should be transmitted by the mobile terminal 100.

Figure 12:
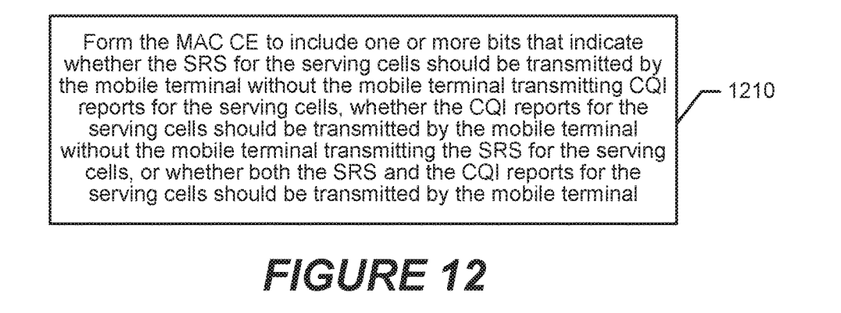

In the embodiment of FIG. 12, the base station 20 forms (block 1210) the MAC CE to comprise one or more bits (e.g., bitmap 200d) that indicate whether the SRS for the one or more serving cells (e.g., SCells and/or PCell) should be transmitted by the mobile terminal 100 without the mobile terminal 100 transmitting CQI reports for the one or more serving cells, whether the CQI reports for the one or more serving cells should be transmitted by the mobile terminal 100 without the mobile terminal 100 transmitting the SRS for the one or more serving cells, or whether both the SRS and the CQI reports for the one or more serving cells should be transmitted by the mobile terminal 100.

In one embodiment the base station 20 configures another mobile terminal 100 with the same SRS configuration which a first mobile terminal 100 is configured with, but which the eNB has ordered to stop transmitting SRS with. This means that two mobile terminals 100 are configured to use the same SRS configuration. The eNB will then use the methods described in other embodiments so as to decide which mobile terminal 100 shall send SRS when. With this embodiment, the base station 20 can use the number of SRS configurations for multiple mobile terminals 100 and decide which mobile terminal 100 shall transmit SRS at one time. It shall be appreciated that this embodiment can be generalized to include more than two mobile terminals 100. This will improve SRS configuration utilization.

The operations illustrated in the flowchart of FIG. 3 and any of the variations described above may be implemented using radio circuitry and electronic data processing circuitry provided in the mobile terminal 100. Likewise, the operations in the flowchart of FIG. 4 (and variations thereof) may be implemented using radio circuitry and electronic data processing circuitry provided in a base station 20.

Figure 5:
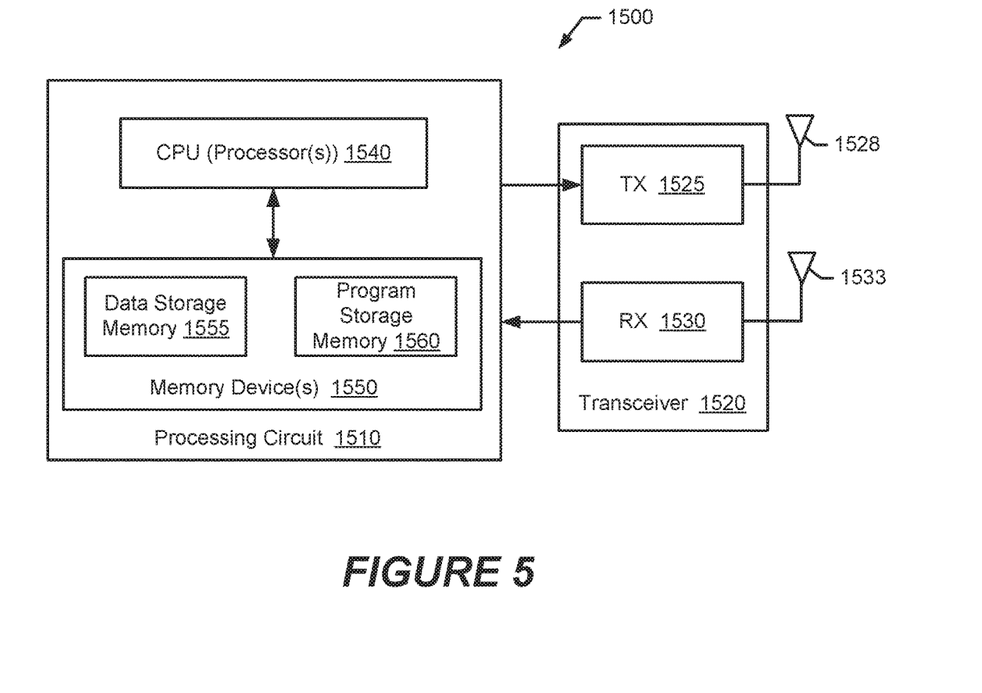
FIG. 5 is a block diagram that illustrates elements of an example communications node that can be common to a base station and a mobile terminal in accordance with some embodiments.

FIG. 5 illustrates features of an example communications node 1500 according to several embodiments of the present invention. Although the detailed configuration, as well as features such as physical size, power requirements, etc., will vary, the general characteristics of the elements of communications node 1500 are common to both a wireless base station 20 and a mobile terminal 100. In either case, the features illustrated in FIG. 5 may be adapted to carry out one or several of the techniques described above for selectively activating/deactivating SRS transmissions on secondary cells in a carrier aggregation system.

Communications node 1500 comprises a transceiver 1520 for communicating with mobile terminals 100 (in the case of a base station 20) or with one or more base stations 20 (in the case of a mobile terminal 100) as well as a processing circuit 1510 for processing the signals transmitted and received by the transceiver 1520. Transceiver 1520 includes a transmitter 1525 coupled to one or more transmit antennas 1528 and receiver 1530 coupled to one or more receive antennas 1533. The same antenna(s) 1528 and 1533 may be used for both transmission and reception. Receiver 1530 and transmitter 1525 use known radio processing and signal processing components and techniques, typically according to a particular telecommunications standard such as the 3GPP standards for LTE and/or LTE-Advanced. Because the various details and engineering tradeoffs associated with the design and implementation of such circuitry are well known and are unnecessary to a full understanding of the invention, additional details are not shown here.

Processing circuit 1510 comprises one or more processors 1540 coupled to one or more memory devices 1550 that make up a data storage memory 1555 and a program storage memory 1560. Processor 1540, identified as CPU 1540 in FIG. 15, may be a microprocessor, microcontroller, or digital signal processor, in some embodiments. More generally, processing circuit 1510 may comprise a processor/firmware combination, or specialized digital hardware, or a combination thereof. Memory 1550 may comprise one or several types of memory such as read-only memory (ROM), random-access memory, cache memory, flash memory devices, optical storage devices, etc. Again, because the various details and engineering tradeoffs associated with the design of baseband processing circuitry for mobile devices and wireless base stations 20 are well known and are unnecessary to a full understanding of the invention, additional details are not shown here.

Typical functions of the processing circuit 1510 include modulation and coding of transmitted signals and the demodulation and decoding of received signals. In several embodiments of the present invention, processing circuit 1510 is adapted, using suitable program code stored in program storage memory 1560, for example, to carry out one of the techniques described above for the base station 20 and/or the mobile terminal 100, such as receiving the new MAC CE described above and selectively activating/deactivating SRS transmissions accordingly, or for determining that such activating/deactivating is desired and forming and transmitting such a MAC CE. Of course, it will be appreciated that not all of the steps of these techniques are necessarily performed in a single microprocessor or even in a single module.

ABBREVIATIONS

3GPP 3$^{rd}$ Generation Partnership Project
ACK Acknowledgement
BS Base Station
CE Control Element
CRS Cell-specific Reference Signal
CSI Channel State Information
CQI Channel Quality Information
DL Downlink
eNodeB evolved Node B
FDD Frequency-Division Duplex
HARQ Hybrid Automatic Repeat Request
LSB Least Significant Bit
LTE Long-Term Evolution
MAC Medium Access Control
MCS Modulation and Coding Scheme
MSB Most Significant Bit
NACK Negative-Acknowledgement
PCell Primary Cell
PMI Precoder Matrix Indicator
pTAG PCell TA Group
RF Radio Frequency
RRC Radio Resource Control
Rx Receive
SCell Secondary Cell
SR Scheduling Requests
SRS Sounding Reference Signal
sTAG SCell TA Group
TDD Time-Division Duplex
TA Timing-Advance
TAG TA Group
TAT Timing-Advance Timer
Tx Transmit
UE User Equipment
UL Uplink

FURTHER DEFINITIONS AND EMBODIMENTS

Examples of several embodiments of the present invention have been described in detail above, with reference to the attached illustrations of specific embodiments. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive.

It will be appreciated by the person of skill in the art that various modifications may be made to the above described embodiments without departing from the scope of the present invention. For example, it will be readily appreciated that although the above embodiments are described with reference to parts of a 3GPP network, an embodiment of the present invention will also be applicable to like networks, such as a successor of the 3GPP network, having like functional components. Therefore, in particular, the terms 3GPP and associated or related terms used in the above description and in the enclosed drawings and any appended claims now or in the future are to be interpreted accordingly.

When a node is referred to as being "connected", "coupled", "responsive", or variants thereof to another node, it can be directly connected, coupled, or responsive to the other node or intervening nodes may be present. In contrast, when an node is referred to as being "directly connected", "directly coupled", "directly responsive", or variants thereof to another node, there are no intervening nodes present. Like numbers refer to like nodes throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but does not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

The invention claimed is:

1. A method in a base station for controlling uplink signaling from a mobile terminal, the method comprising:
   determining that at least one of Sounding Reference Signals, SRS, or Channel Quality Indicator, CQI, reports from the mobile terminal should be selectively activated or deactivated for one or more serving cells configured for the mobile terminal;
   forming a medium access control, MAC, control element, CE, a portion of said MAC CE indicating, individually for the one or more serving cells, whether at least one of the SRS or the CQI reports should be transmitted by the mobile terminal responsive to the determining; and
   transmitting the MAC CE to the mobile terminal,
   wherein the portion of the MAC CE is further formed to comprise a bitmap containing a plurality of bits, respective ones of the plurality of bits indicating, separately from activation or deactivation of the one or more serving cells, whether the SRS for the one or more serving cells should be transmitted without transmitting CQI reports for the one or more serving cells, whether the CQI reports for the one or more serving cells should be transmitted without transmitting the SRS for the one or more serving cells, or whether both the SRS and the CQI reports for the one or more serving cells should be transmitted.

2. The method of claim 1,
   further comprising determining that both the SRS and the CQI reports from the mobile terminal should be selectively activated or deactivated for the one or more serving cells; and
   wherein the portion of the MAC CE is further formed to indicate, individually for the one or more serving cells, whether both the SRS and the CQI reports should be transmitted by the mobile terminal.

3. The method of claim 1,
   further comprising determining whether channel state information comprising the CQI reports, rank indicators indicating transmission rank, and precoder matrix indicators should be selectively activated or deactivated, for the one or more serving cells; and
   wherein the portion of the MAC CE is further formed to indicate, individually for the one or more serving cells, whether the CQI reports, the rank indicators, and the precoder matrix indicators should be transmitted by the mobile terminal.

4. The method of claim 1, wherein:
   the portion of the MAC CE is further formed to comprise a bitmap comprising a bit value for each of one or more secondary cells, SCells, configured for the mobile terminal which indicates whether at least one of the SRS or the CQI reports for the SCell should be transmitted by the mobile terminal.

5. The method of claim 4, wherein:
   the portion of the MAC CE is further formed to further comprise a bit value for a primary cell, PCell, configured for the mobile terminal which indicates whether at least one of the SRS or the CQI reports for the PCell should be transmitted by the mobile terminal.

6. The method of claim 4, wherein:
   the bitmap comprises at least 4 bit values for each of at least four of the SCells which indicate whether at least one of the SRS or the CQI reports for each of the at least four of the SCells should be transmitted by the mobile terminal.

7. A mobile terminal that controls uplink signaling to a base station, the mobile terminal comprising:
   at least one processor; and
   at least one memory coupled to the at least one processor and comprising computer readable program code that when executed by the at least one processor causes the at least one processor to perform operations comprising:
      receiving a medium access control, MAC, control element, CE, from the base station, wherein a portion of the MAC CE indicates, individually for one or more serving cells configured for the mobile terminal, whether at least one of Sounding Reference Signals, SRS, or Channel Quality indicator, CQI, reports should be transmitted;

selectively activating and deactivating transmission of at least one of the SRS or the CQI reports for the one or more serving cells from the mobile terminal to the base station responsive to the portion of the MAC CE;

receiving the portion of the MAC CE from the base station as a bitmap containing a plurality of bits, respective ones of the plurality of bits indicating, separately from activation or deactivation of the one or more serving cells, whether the SRS for the one or more serving cells should be transmitted without transmitting CQI reports for the one or more serving cells, whether the CQI reports for the one or more serving cells should be transmitted without transmitting the SRS for the one or more serving cells, or whether both the SRS and the CQI reports for the one or more serving cells should be transmitted; and separately activating and deactivating transmission of the at least one of the SRS or the CQI reports for the one or more serving cells from the mobile terminal to the base station responsive to the bits of the bitmap in the portion of the MAC CE.

8. A base station that controls uplink signaling from a mobile terminal, the base station comprising:

at least one processor; and at least one memory coupled to the at least one processor and comprising computer readable program code that when executed by the at least one processor causes the at least one processor to perform operations comprising:

determining that at least one of Sounding Reference Signals, SRS, or Channel Quality Indicator, reports from the mobile terminal should be selectively activated or deactivated for one or more serving cells configured for the mobile terminal;

forming a medium access control, MAC, control element, CE, a portion of said MAC CE indicating, individually for the one or more serving cells, whether at least one of the SRS or the CQI reports should be transmitted by the mobile terminal responsive to the determining; and transmitting the MAC CE to the mobile terminal, wherein the portion of the MAC CE is further formed to comprise a bitmap containing a plurality of bits, respective ones of the plurality of bits indicating, separately from activation or deactivation of the one or more serving cells, whether the SRS for the one or more serving cells should be transmitted without transmitting CQI reports for the one or more serving cells, whether the CQI reports for the one or more serving cells should be transmitted without transmitting the SRS for the one or more serving cells, or whether both the SRS and the CQI reports for the one or more serving cells should be transmitted.

9. The base station of claim 8, wherein the plurality of bits comprise:

a first bit indicating that the SRS for the one or more serving cells should be transmitted; and a second bit, different from the first bit, indicating that the CQI reports for the one or more serving cells should be transmitted.

10. A method in a mobile terminal for controlling uplink signaling to a base station, the method comprising:

receiving a medium access control, MAC, control element, CE, from the base station wherein a portion of the MAC CE indicates, individually for one or more serving cells configured for the mobile terminal, whether at least one of Sounding Reference Signals, SRS, or Channel Quality Indicator CQI, reports should be transmitted; and selectively activating and deactivating transmission of at least one of the SRS or the CQI reports for the one or more serving cells from the mobile terminal to the base station responsive to the portion of the MAC, wherein receiving the MAC CE from the base station comprises receiving one or more bits that indicate, individually for the one or more serving cells, whether the SRS for the one or more serving cells should be transmitted without transmitting CQI reports for the one or more serving cells, whether the CQI reports for the one or more serving cells should be transmitted without transmitting the SRS for the one or more serving cells, or whether both the SRS and the CQI reports for the one or more serving cells should be transmitted, and wherein selectively activating and deactivating transmission of at least one of the SRS or the CQI reports for the one or more serving cells to the base station is responsive to the one or more bits of the portion of the MAC CE.

11. The method of claim 10, wherein the portion of the MAC CE indicates, individually for the one or more serving cells, whether both the SRS and the CQI reports should be transmitted; and further comprising selectively activating and deactivating transmission of both the SRS and the CQI reports for the one or more serving cells to the base station responsive to the portion of the MAC CE.

12. The method of claim 10, wherein:

the portion of the MAC CE indicates, individually for the one or more serving cells, whether channel state information comprising the CQI reports, rank indicators indicating transmission rank, and precoder matrix indicators should be transmitted; and selectively activating and deactivating transmission of at least one of the SRS or the CQI reports for the one or more serving cells from the mobile terminal to the base station comprises selectively activating and deactivating transmission of the channel state information comprising the CQI reports, the rank indicators, and the precoder matrix indicators for the one or more serving cells to the base station responsive to the portion of the MAC CE.

13. The method of claim 10, wherein receiving the MAC CE from the base station comprises receiving a bitmap within the portion of the MAC CE comprising a bit value for each of one or more secondary cells, SCells, configured for the mobile terminal which indicates whether at least one of the SRS or the CQI reports for the SCell should be transmitted, and wherein selectively activating and deactivating transmission of at least one of the SRS or the CQI reports for each of the one or more SCells to the base station responsive to the portion of the MAC CE comprises selectively activating and deactivating transmission of at least one of the SRS or the CQI reports for each of the one or more SCells responsive to the bit value of the bitmap corresponding to the SCell.

14. The method of claim 13, wherein the bitmap received further comprises a bit value for a primary cell, PCell, configured for the mobile terminal which indicates whether at least one of the SRS or the CQI reports for the PCell should be transmitted; and
  further comprising selectively activating and deactivating transmission of at least one of the SRS or the CQI reports for the PCell responsive to the bit value of the bitmap for the PCell.

15. The method of claim 13, wherein:
the bitmap received comprises at least 4 bit values for each of at least four of the SCells which indicate, individually for the at least four of the SCells, whether at least one of the SRS or the CQI reports should be transmitted; and
selectively activating and deactivating transmission of the SRS for each of the one or more SCells to the base station responsive to the portion of the MAC CE comprises selectively activating and deactivating transmission of at least one of the SRS or the CQI reports for each of the at least four of the SCells responsive to the bit value of the bitmap for the SCell.

\* \* \* \* \*